(12) United States Patent
Degura

(10) Patent No.: US 11,736,790 B2
(45) Date of Patent: Aug. 22, 2023

(54) ELECTRONIC DEVICE AND CONTROL METHOD

(71) Applicant: CANON KABUSHIKI KAISHA, Tokyo (JP)

(72) Inventor: Yasusaburo Degura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 469 days.

(21) Appl. No.: 17/067,462

(22) Filed: Oct. 9, 2020

(65) Prior Publication Data
US 2021/0029282 A1     Jan. 28, 2021

Related U.S. Application Data

(63) Continuation of application No. PCT/JP2019/006815, filed on Feb. 22, 2019.

(30) Foreign Application Priority Data

Apr. 11, 2018 (JP) ................................ 2018-076245
Jan. 24, 2019 (JP) ................................ 2019-010542

(51) Int. Cl.
*H02J 7/00* (2006.01)
*H04N 23/60* (2023.01)
*G09G 5/00* (2006.01)

(52) U.S. Cl.
CPC ............ *H04N 23/60* (2023.01); *G09G 5/006* (2013.01); *H02J 7/0045* (2013.01); *G09G 2330/02* (2013.01); *G09G 2370/04* (2013.01)

(58) Field of Classification Search
CPC ........ H04N 23/60; H04N 23/65; G09G 5/006; G09G 2330/02; G09G 2370/04; G09G 2330/021; H02J 7/0045; H02J 7/00034

USPC ..................................................... 348/333.01
See application file for complete search history.

(56) References Cited

U.S. PATENT DOCUMENTS

2013/0193756 A1* 8/2013 Fukaya .................. H02J 50/20
                                                       320/108

FOREIGN PATENT DOCUMENTS

| JP | 2012-215993 A | 11/2012 |
|---|---|---|
| JP | 2016-036202 A | 3/2016 |
| JP | 2017-038429 A | 2/2017 |
| JP | 2018-041170 A | 3/2018 |
| WO | 2016/013451 A1 | 3/2016 |

OTHER PUBLICATIONS

The International Search Report of PCT/JP2019/006815 dated Apr. 9, 2019.

* cited by examiner

*Primary Examiner* — Stephen P Coleman
(74) *Attorney, Agent, or Firm* — Cowan, Liebowitz & Latman, P.C.

(57) ABSTRACT

An electronic device includes a communication unit that that acquires a power supply capability of an external apparatus via a CC terminal, and a control unit that performs control such that electrical power received via a VBUS terminal is supplied to a load if it is determined through the communication that the external apparatus has a predetermined power supply capability, and performs control such that electrical power received via the VBUS terminal is not supplied to the load if it is determined that the external apparatus has the predetermined power supply capability without performing the communication.

26 Claims, 11 Drawing Sheets

FIG. 4

| External Power Supply Apparatus | Camera State | Power OFF | Power ON |
|---|---|---|---|
| TYPE-C PD IS SUPPORTED | 9V·3A | Electrical power from VBUS terminal is supplied to battery | Electrical power from VBUS terminal is supplied to system control unit |
| | 5V·3A | | Electrical power from VBUS terminal is supplied to battery |
| | 5V·1.5A | | |
| TYPE-C PD IS NOT SUPPORTED | 5V·3A | | Electrical power from VBUS terminal is not supplied to system control unit |
| | 5V·1.5A | | Electrical power from VBUS terminal is not supplied to battery |
| | 5V·0.5A | | |

ELECTRONIC DEVICE AND CONTROL METHOD

CROSS-REFERENCE TO RELATED APPLICATIONS

This application is a Continuation of International Patent Application No. PCT/JP2019/006815, filed Feb. 22, 2019, which claims the benefit of Japanese Patent Application No. 2018-076245, filed Apr. 11, 2018 and Japanese Patent Application No. 2019-010542, filed Jan. 24, 2019, all of which are hereby incorporated by reference herein in their entirety.

BACKGROUND

Field of the Invention

Aspects of the disclosure generally relates to an electronic device that can operate using electrical power from an external apparatus, and a control method thereof.

Description of the Related Art

A USB type-C cable and a connector are standardized in the USB (Universal Serial Bus) 3.1 standard. Also, USB PD (Power Delivery) Revision 2.0/3.0 in which DC power is supplied between devices using a USB Type-C cable and a connector is standardized. In USB PD, a larger current and a higher voltage than in USB BC (Battery Charging) Specification Revision 1.2 and USB Type-C Revision 1.2 can be used.

A configuration is known in which an electronic device such as a digital camera is operated and a mounted battery is charged using electrical power received via the USB Type-C connector. This kind of electronic device that receives electrical power via the USB Type-C connector performs power reception control while grasping the type of the external apparatus that is connected. Japanese Patent Laid-Open No. 2012-215993 discloses an electronic device that starts supplying electricity to a connected apparatus if a change in the potential of the connection terminal is detected.

It is conceivable that if Japanese Patent Laid-Open No. 2012-215993 is applied to USB Type-C, the power supply capability of the connected external apparatus is detected based on a change in the terminal voltage of the CC terminal. However, in the detection of the power supply capability of the USB Type-C, which is performed using the voltage of the CC terminal, the wrong power supply capability information is acquired in some cases, such as when a non-regular cable of USB Type-C is used. If supply of power is requested to the external apparatus in accordance with the erroneous power supply capability information, there is a possibility that the external apparatus will not be able to provide the requested electrical power and the electronic device that operates relying on the supply of power from the external apparatus will stop operation.

SUMMARY

According to one aspect of the embodiments, there is provided an electronic device or a method that can perform power reception control upon detecting that a connected external apparatus conforms to a USB PD standard and has a desired power supply capability.

According to one aspect of the embodiments, there is provided an electronic device comprising: a communication unit that acquires a power supply capability of an external apparatus via a CC terminal; and a control unit that performs control such that electrical power received via a VBUS terminal is supplied to a load if it is determined through the communication that the external apparatus has a predetermined power supply capability, and performs control such that electrical power received via the VBUS terminal is not supplied to the load if it is determined that the external apparatus has the predetermined power supply capability without performing the communication.

According to another aspect of the embodiments, there is provided a method comprising: acquiring a power supply capability of an external apparatus via a CC terminal; performing control such that electrical power received via a VBUS terminal is supplied to a load if it is determined through the communication that the external apparatus has a predetermined power supply capability; and performing control such that electrical power received via the VBUS terminal is not supplied to the load if it is determined that the external apparatus has the predetermined power supply capability without performing the communication.

According to another aspect of the embodiments, there is provided a non-transitory storage medium that stores a program causing a computer to execute a method, the method comprising: acquiring a power supply capability of an external apparatus via a CC terminal; performing control such that electrical power received via a VBUS terminal is supplied to a load if it is determined through the communication that the external apparatus has a predetermined power supply capability; and performing control such that electrical power received via the VBUS terminal is not supplied to the load if it is determined that the external apparatus has the predetermined power supply capability without performing the communication.

Further aspects of the embodiments will become apparent from the following embodiments.

BRIEF DESCRIPTION OF THE DRAWINGS

FIG. 4 is a diagram showing an example of power reception control performed according to the type of the external apparatus, according to the first embodiment.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1A:
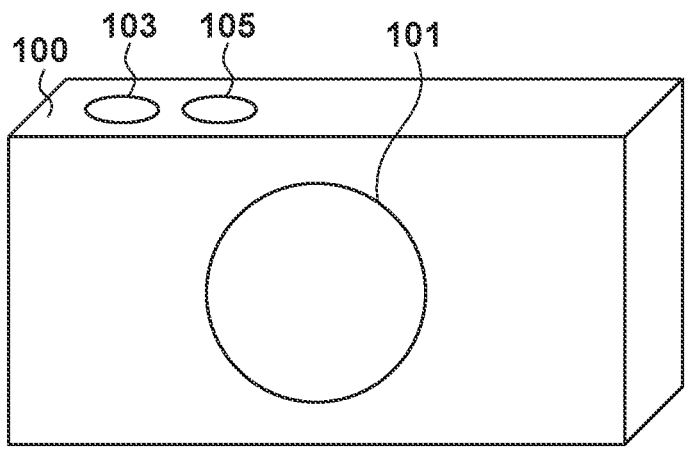
FIG. 1A is a diagram showing an exterior of a digital camera serving as one example of an electronic device according to a first embodiment.
Figure 1B:
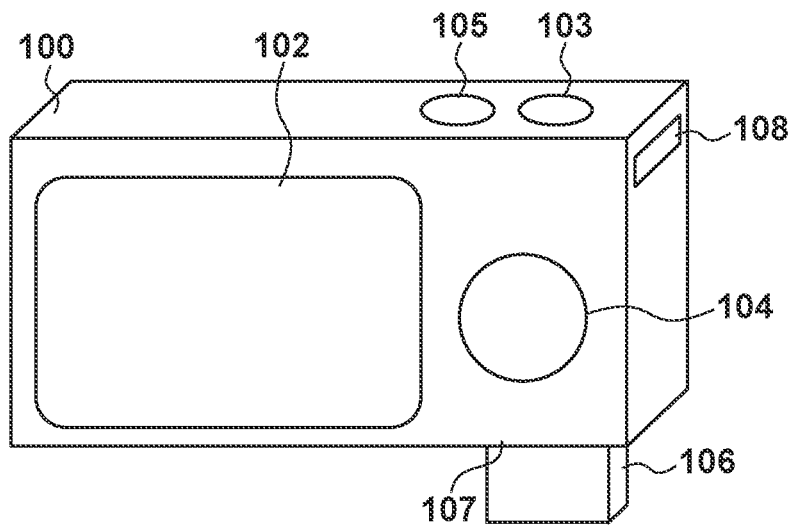
FIG. 1B is a diagram showing an exterior of a digital camera serving as one example of the electronic device according to the first embodiment.

FIGS. 1A and 1B are diagrams showing the exterior of a digital camera 100 serving as an example of an electronic device. FIG. 1A is a view of the digital camera 100 from the front, and FIG. 1B is a view of the digital camera 100 from behind. An image capture optical system 101 is equipped with a lens and a shutter, and forms an object image on a light receiving surface of an image sensor such as a CCD sensor. A display unit 102 includes a liquid crystal display or the like and displays an image and various types of information. A shutter button 103 is a button switch by which the user performs a shooting instruction. An operation unit 104 has operation members such as various switches, buttons, and a touch panel that receive various operations from the user. A power switch 105 is a switch by which the user switches the power of the camera 100 on or off. A battery 106 is a chargeable battery represented by a lithium ion secondary battery. A battery connection unit 107 connects the battery 106 to the digital camera 100. An external connection unit 108 has a USB interface and, for example, can connect a USB Type-C cable.

Figure 2:
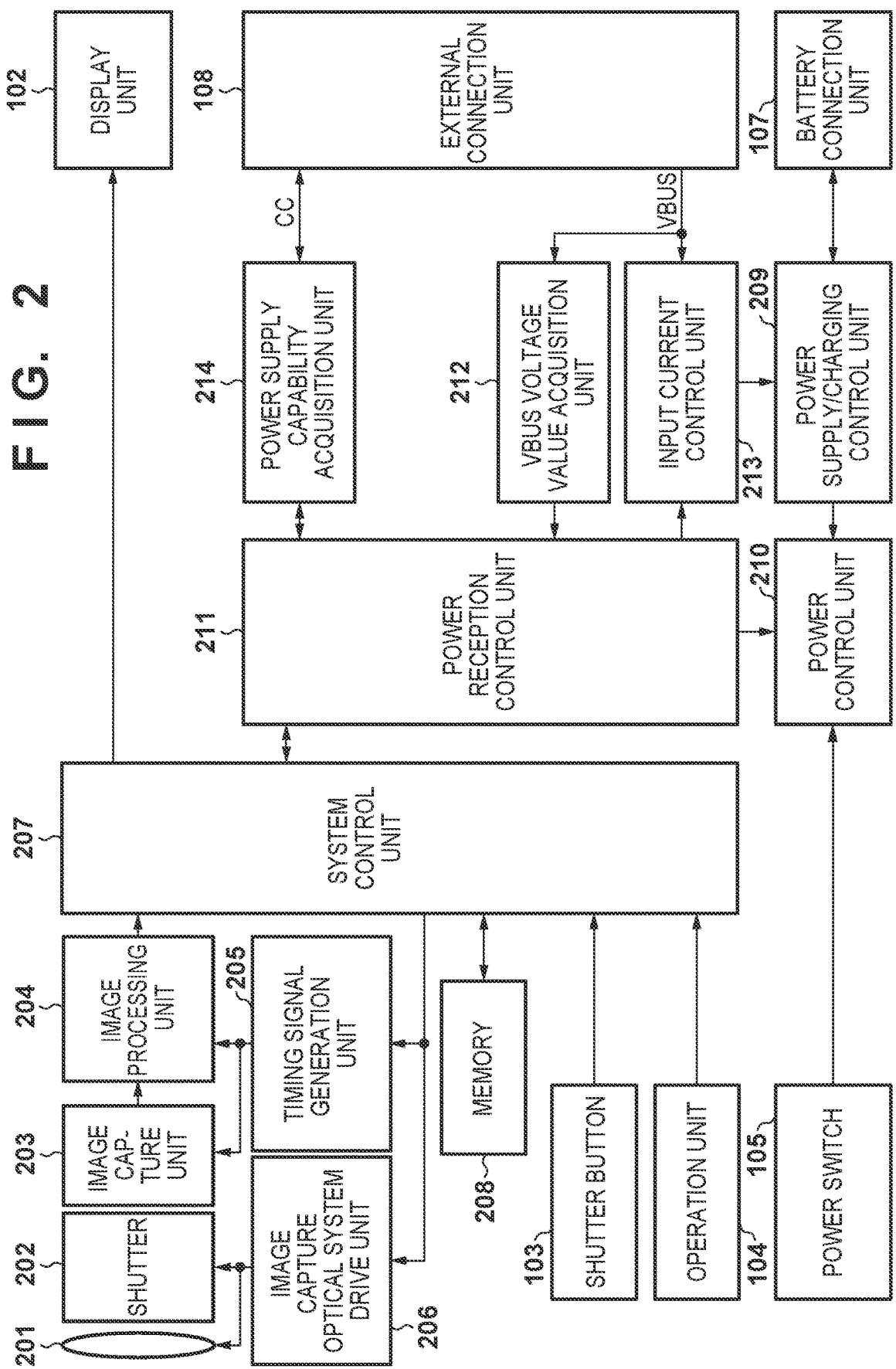
FIG. 2 is a block diagram showing an example of a configuration of a digital camera 100 according to the first embodiment.

FIG. 2 is a block diagram showing an example of a configuration of the digital camera 100 according to the first embodiment. In FIG. 2, the image capture optical system 101 includes a shooting lens 201 and a shutter 202. An image capture unit 203 includes, for example, a CCD sensor, and converts an optical image into an electrical signal. An image processing unit 204 includes a correlated double sampling unit, a programmable gain amp unit that can be set to a desired amplification degree, and an analog-digital converter, and performs analog signal processing on the output signal from the image capture unit 203. A timing signal generation unit 205 generates signals for respectively causing the image capture unit 203 and the image processing unit 204 to operate. The image optical system drive unit 206 respectively causes the shooting lens 201 and the shutter 202 to operate.

A system control unit 207 includes at least one processor (CPU) and a memory, and is an electronic circuit that performs overall control of the digital camera 100 due to at least one processor executing a program stored in the memory. The system control unit 207 operates using electrical power supplied from the power control unit 210. That is, it can be said that the system control unit 207 is a load to which electrical power is applied from the power control unit 210. It should be noted that examples of this kind of load other than the system control unit 207 (processor) can include at least one of a circuit for controlling the image capture unit 203 (e.g., includes the image processing unit 204, the timing signal generation unit 205, and the image capture optical system drive unit 206), and a display control circuit for causing images to be displayed on the display unit 102. The image signal from the image processing unit 204 is written in the memory 208 via the system control unit 207. The memory 208 stores image data obtained by the image capture unit 203 and converted into digital data by the image processing unit 204, image data to be displayed on the display unit 102, and the like. The memory 208 includes a storage capacity that is sufficient for storing a predetermined number of still images and a moving image and audio of a predetermined amount of time. The memory 208 is also used as a memory for image display (video memory). The system control unit 207 superimposes predetermined data as needed on data for image display that is stored in the memory 208, and supplies the resulting data to the display unit 102. In this manner, the image data for display that is written in the memory 208 is displayed by the display unit 102, which is a display device such as a liquid crystal display.

The shutter button 103 and the operation unit 104 are operation means for inputting various operation instructions into the system control unit 207. With a halfway operated signal, that is, a so-called halfway pressed (shooting preparation instruction) signal from the shutter button 103, the system control unit 207 starts operations such as an AF (auto-focus) process, an AE (auto-exposure) process, and an AWB (auto-white balance) process. With an operation complete signal, that is, a so-called full-press (shooting instruction) signal from the shutter button 103, the system control unit 207 starts a shooting operation from reading out a signal from the image capture unit 203 to writing the image data in a recording medium such as an SD card (not shown).

A power supply/charging control unit 209 supplies electrical power of the battery 106 connected to the battery connection unit 107 to the power control unit 210. Also, the power supply/charging control unit 209 can supply the power received from the VBUS terminal of the external connection unit 108 to the power control unit 210. Furthermore, the power supply/charging control unit 209 can charge the battery 106 connected to the battery connection unit 107 with the electrical power received from the VBUS terminal of the external connection unit 108.

The power control unit 210 supplies needed electrical power supplied from the power supply/charging control unit 209 to the units including the system control unit 207 for a needed period based on an instruction from the power switch 105 or a later-described power reception control unit 211. The power control unit 210 can supply the needed power to the power reception control unit 211, a later-described VBUS voltage value acquisition unit 212, an input current control unit 213, and a power supply capability acquisition unit 214 without an instruction from the power switch 105 or the power reception control unit 211.

The external connection unit 108 is an interface that conforms to USB 3.0, USB Type-C, and USB Power Delivery (PD) standards. The external connection unit 108 includes multiple terminals for connecting to external apparatuses. The external connection unit 108 includes a CC terminal, a VBUS terminal, a GND terminal, and multiple data terminals. In the USB Type-C standard, electrical power that can be supplied by a connected external apparatus (power supply capability) can be detected, and electrical power that is used can be managed using the voltage of the CC (Configuration Channel) terminal. Also, in the USB 3.0 POWER DELIVERY standard, electrical power to be supplied can be negotiated with the connected external apparatus and electrical power that is used can be managed by communication (PD communication) using the CC terminal. The VBUS terminal is a terminal that receives electrical power from an external apparatus. The VBUS voltage value acquisition unit 212 acquires voltage value information of the VBUS terminal of the external connection unit 108 and transmits the acquired voltage value information to the power reception control unit 211. The input current control unit 213 can restrict the upper limit value of the current received from the VBUS terminal according to an instruction from the power reception control unit 211. The power supply capability acquisition unit 214 is connected to the CC terminal of the external connection unit 108. Under the control of the power reception control unit 211, the power supply capability acquisition unit 214 can detect the CC terminal voltage for determining the supplied electrical power of the external apparatus, and can negotiate electrical power to be supplied through communication (PD communication) with the external apparatus using the CC terminal.

The power reception control unit 211 can negotiate electrical power to be supplied with the external apparatus connected to the external connection unit 108 via the power supply capability acquisition unit 214 and can manage electrical power that is used. Also, the power reception control unit 211 can acquire voltage value information of the VBUS terminal from the VBUS voltage value acquisition unit 212. Furthermore, the power reception control unit 211 can provide power reception control information to the system control unit 207 and can receive instructions from the system control unit 207. The power reception control unit 211 can instruct input current control to the input current control unit 213 and can instruct the start of supply of the power to a predetermined unit to the power control unit 210 with reference given to the type of the external apparatus, voltage value information of the VBUS terminal, and instructions from the system control unit 207.

Figure 3A:
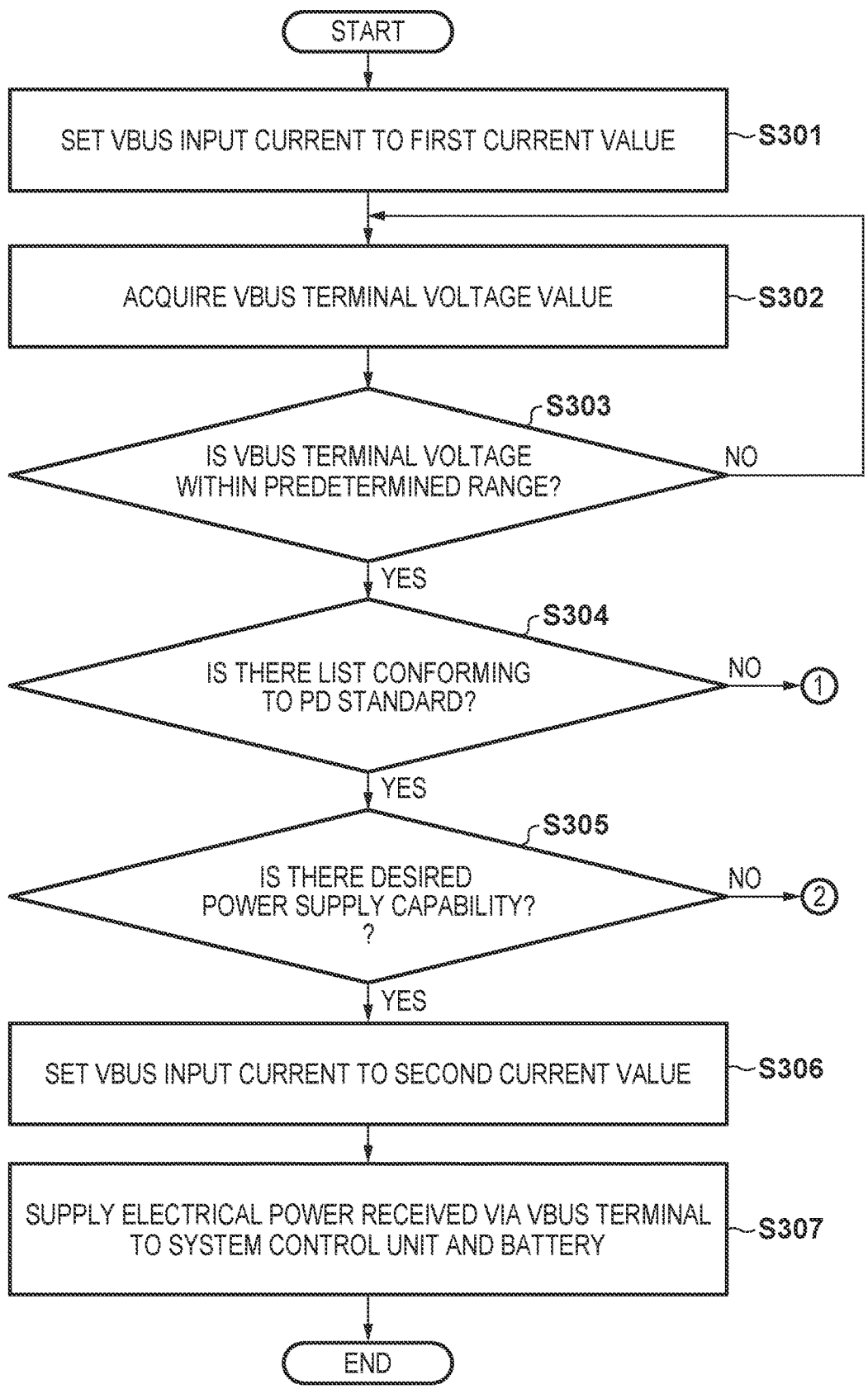
FIG. 3A is a flowchart showing an example of a control operation of the digital camera according to the first embodiment.
Figure 3B:
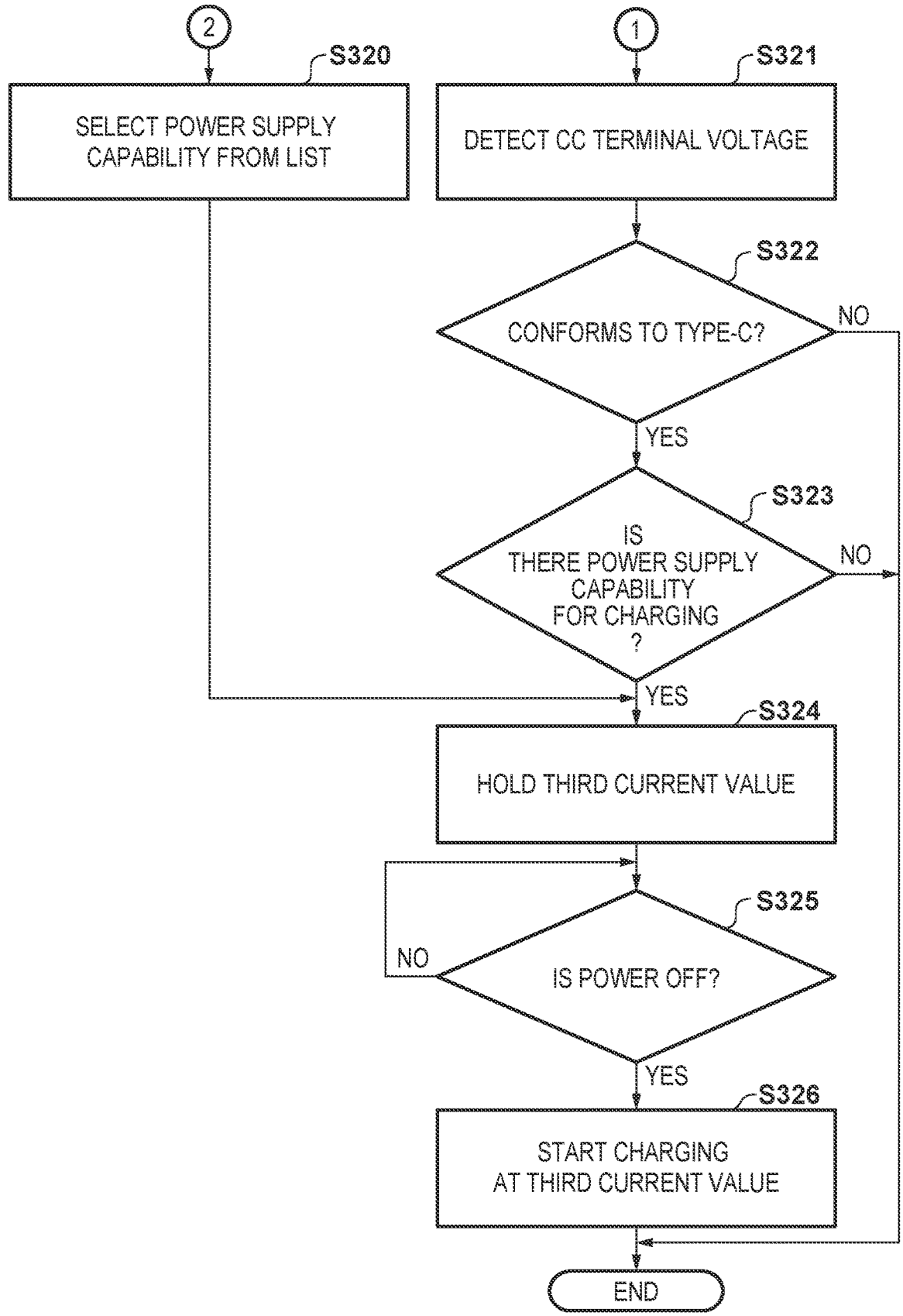
FIG. 3B is a flowchart showing an example of a control operation of the digital camera according to the first embodiment.

FIGS. 3A and 3B are flowcharts showing an example of control operation processing performed when the external apparatus is connected to the external connection unit 108 using a USB Type-C cable in a state in which the power of the digital camera 100 configured as described above is on. Note that the processing shown in FIGS. 3A and 3B is premised on the battery 106 being mounted, and the digital camera 100 being driven using electrical power supplied from the battery 106. The state in which the battery 106 is mounted is a state in which the battery 106 is connected to the battery connection unit 107.

The power reception control unit 211 sets the upper limit value of the current to be received from the VBUS terminal in the input current control unit 213 to a first current value (step S301). The first current value is, for example, 2.5 mA, and the digital camera 100 operates using electrical power from the battery 106 connected to the battery connection unit 107. Next, the power reception control unit 211 acquires voltage value information of the VBUS terminal from the VBUS voltage value acquisition unit 212 (step S302). The power reception control unit 211 determines whether or not the voltage of the VBUS terminal is a value in a predetermined range based on the voltage value information acquired by the VBUS voltage value acquisition unit 212 in step S302 (step S303). The voltage in the predetermined range is, for example, 4.75 V or more and 5.25 V or less (5 V±5%). If the VBUS terminal voltage is not a value in the predetermined range (No in step S303), the power reception control unit 211 returns the processing to step S302.

If the VBUS terminal voltage is a value in a predetermined range (Yes in step S303), the power reception control unit 211 checks whether or not the external apparatus has a power supply capability list conforming to the USB 3.0 POWER DELIVERY standard via the power supply capability acquisition unit 214 (step S304). As described above, the power reception control unit 211 can acquire a power supply capability list from an external apparatus conforming to the PD standard by performing negotiation through PD communication using the CC terminal via the power supply capability acquisition unit 214. The power supply capability list is a maximum current value supported by the external apparatus for each predetermined output voltage, and for example, is 5 V/3 A, 9 V/3 A, and 15 V/3 A. That is, the power supply capability list indicates the conditions of electrical power that can be supplied by the external apparatus to an apparatus (digital camera 100) that is connected to the external apparatus. The condition of electrical power is indicated by a combination of a voltage and a maximum current value. When a power supply capability list is acquired through PD communication via the CC terminal, the power reception control unit 211 determines that the external apparatus is a source device that conforms to the USB 3.0 Power Delivery standard. If it is determined that the external apparatus includes a power supply capability list that conforms to the USB 3.0 POWER DELIVERY standard (Yes in step S304), the power reception control unit 211 checks whether or not the power supply capability list includes a desired power supply capability (step S305). On the other hand, if the external apparatus does not have a power supply capability list that conforms to the USB 3.0 POWER DELIVERY standard (No in step S304), the power reception control unit 211 advances the processing to step S321 of FIG. 3B. Note that if the power supply list was acquired from the external apparatus, PD communication with external apparatus is considered to have been established. Accordingly, if the power supply list cannot be acquired from the external apparatus, PD communication with the external apparatus is not established.

If it is determined that the power supply capability list has a desired power supply capability, for example, 5 V/3 A (Yes in step S305), the power reception control unit 211 sets the upper limit value of the current received by the input current control unit 213 through the VBUS terminal to a second current value, and supplies electrical power to the system control unit 207 using the electrical power received via the VBUS terminal (step S306). In this manner, if the power reception control unit 211 confirms through PD communication that electrical power that can be supplied by the external apparatus is greater than or equal to a threshold value, the power reception control unit 211 determines that the external apparatus has a predetermined power supply capability, and supplies the electrical power received from the external apparatus via the VBUS terminal to the system control unit 207. When electrical power is supplied to the system control unit 207, the image capturing process, the displaying process, and the like of the digital camera 100 can be executed. That is, the digital camera 100 can be caused to transition to a driving state. If there is no desired power supply capability in the power supply capability list (No in step S305), the power reception control unit 211 advances the processing to step S320 of FIG. 3B. The second current value is, for example, 3 A. Due to the second current value being set, electrical power that can drive the electronic device and charge the battery 106 can be received from the external apparatus. The power supply/charging control unit 209 supplies electrical power supplied to the power control unit 210 through the VBUS terminal to the power control unit 210 and the battery connection unit 107 in response to the second current value being set in the input current control unit 213 (step S307). As a result, the power control unit 210 provides the power for driving the apparatus using electrical power supplied through the VBUS terminal, and the battery connection unit 107 performs charging of the battery with electrical power supplied from the VBUS terminal.

As described above, if it is detected that the external apparatus has a power supply list that conforms to the USB 3.0 POWER DELIVERY standard and has a desired power supply capability, the power reception control unit 211 changes the upper limit value of the current received from the VBUS terminal from the first current value to the second current value. That is, if it is determined based on the result of performing PD communication that the external apparatus has a predetermined power supply capability conforming to the USB 3.0 POWER DELIVERY standard (if the external apparatus has a power supply capability of a predetermined electrical power or more), operation for supplying the electrical power received via the VBUS terminal to the system (system power supply operation) is made possible. Here, the system includes, for example, at least the system control unit 207. Accordingly, the power reception control unit 211 changes the supply source of electrical power needed for the operation of the digital camera 100 from the battery 106 to the external apparatus.

Also, the power supply/charging control unit 209 can supply electrical power of the battery 106 or electrical power from the external apparatus to the power control unit 210, and furthermore, can charge the battery 106 with electrical power from the external apparatus. Accordingly, the power supply/charging control unit 209 can control the power supply such that the battery 106 is charged with a current value that does not exceed the upper limit value of the received current, while simultaneously driving the digital camera 100 with electrical power of the external apparatus.

Next, FIG. 3B will be used to describe operations that are performed if the external apparatus does not have a power supply capability list conforming to the USB 3.0 POWER DELIVERY standard (No in step S304) or if there is no desired power supply capability in the power supply capability list (No in step S305) when the power of the digital camera 100 is on. In this case (if it is determined that the external apparatus does not have a desired power supply capability that conforms to the USB 3.0 POWER DELIVERY standard), the system power supply operation performed with electrical power from the VBUS terminal is not executed. Accordingly, the power supply/charging control unit 209 performs power control for controlling the power supply so as to enable an operation of supplying the electrical power received from the battery 106 to the system.

If a power supply capability list is acquired but there is no desired power supply capability in the power supply capability list (No in step S305), the power reception control unit 211 selects one power supply capability from the acquired power supply capability list (step S320). For example, the maximum power supply capability in the power supply capability list is selected. In the present embodiment, if the external apparatus conforms to the USB 3.0 POWER DELIVERY standard, it is determined that at least charging is possible when the power is off. Accordingly, the processing advances to step S324. On the other hand, if the power supply list is not acquired (No in step S304), the power reception control unit 211 detects the voltage of the CC terminal (step S321) and determines whether or not the external apparatus conforms to the Type-C standard based on the detected voltage value of the CC terminal (step S322). If it is determined that the external apparatus does not conform to the Type-C standard, the processing ends (No in step S322). If it is determined that the external apparatus conforms to the Type-C standard (Yes in step S322), the processing advances to step S323. The power reception control unit 211 determines the power supply capability of the external apparatus based on the detected voltage value of the CC terminal and determines whether or not the external apparatus has a power supply capability for charging (whether or not a power supply setting for charging is possible) (step S323). If it is determined that the external apparatus does not include a power supply capability for charging (No in step S323), the processing ends.

After the power supply capability is acquired from the power supply capability list (step S320), or if it is determined that the external apparatus has a power supply capability for charging (Yes in step S323), the power reception control unit 211 holds a third current value to be set in the input current control unit 213 (step S324). The third current value is set for the input current control unit 213 when the power of the digital camera 100 is off. Thereafter, when the power of the digital camera 100 serving as the electronic device is turned off (Yes in step S325), the power reception control unit 211 sets the third current value in the input current control unit 213. The power supply/charging control unit 209 starts charging the battery connected to the battery connection unit 107 using electrical power supplied from the VBUS terminal, in response to the third current value being set in the input current control unit 213 (step S326).

According to the above-described processing of FIG. 3B, if the power of the digital camera 100 is off, the upper limit value of the current received from the VBUS terminal can be changed from the first current value to the third current value and the battery 106 can be charged. Note that the power supply capability acquisition unit 214 can detect the power supply capability of the connected external apparatus using the CC terminal voltage. For example, if the CC terminal voltage is 0.25 V to 0.61 V, the power supply capability is 5 V/0.5 A, if the CC terminal voltage is 0.70 V to 1.16 V, the power supply capability is 5 V/1.5 A, and if the CC terminal voltage is 1.31 V to 2.04 V, the power supply capability is 5 V/3 A. The power reception control unit 211 can refer to the CC terminal voltage value information detected by the power supply capability acquisition unit 214, set the third current value to 1.5 A or 3 A, and charge the battery 106 using electrical power of the external apparatus.

Note that as is evident based on the foregoing description, even if it is determined based on the CC terminal voltage in step S323 that the power supply capability of the external apparatus is 5 V/3 A, the power reception control unit 211 does not supply electrical power supplied via the VBUS terminal to the system. That is, even if it is confirmed that the power supply capability of the external apparatus includes a predetermined power supply capability regardless of the result of the PD communication, the power reception control unit 211 does not supply electrical power supplied via the VBUS terminal to the system.

FIG. 4 is a diagram showing an example of power reception control that corresponds to the state of the digital camera 100 and the type of the external apparatus connected to the external connection unit 108, according to the above-described processing of FIGS. 3A and 3B. In the example of the illustration, if the external apparatus corresponds to the USB 3.0 POWER DELIVERY standard and has a power supply capability that has a voltage of 5 V and a current value of 3 A or more, electrical power supplied from the VBUS terminal when the power is on is supplied to the system control unit 207, and the supplied electrical power is used to charge the battery 106.

Also, as shown in FIG. 4, when the power of the digital camera 100 is off, if it is detected that the external apparatus includes a power supply capability list that conforms to the USB 3.0 POWER DELIVERY standard, the power reception control unit 211 can charge the battery 106 with electrical power of the external apparatus. Note that the power reception control unit 211 sets the upper limit value of the current received from the VBUS terminal to the second current value. If it is detected that the external apparatus conforms to the USB Type-C standard and has a power supply capability of 1.5 A or 3 A, the power reception control unit 211 can charge the battery 106 using electrical power of the external apparatus. Note that the power reception control unit 211 sets the upper limit value of the current received from the VBUS terminal to the third current value. In the example of FIG. 4, if the external apparatus does not have a power supply capability list that conforms to the USB 3.0 POWER DELIVERY standard, conforms to the USB Type-C standard, and does not have a power supply capability of 1.5 A or 3 A, the power reception control unit 211 sets the upper limit value of the current received from the VBUS terminal to the first current value. In this case, the power reception control unit 211 does not enable charging of the battery 106 with electrical power of the external apparatus. Note that if the power of the digital camera 100 is off, electrical power is not supplied to the system due to the fact that there is no need to operate the system control unit 207.

In FIG. 4, if the power of the digital camera 100 is on, the power reception control unit 211 detects that the external apparatus has a power supply capability list that conforms to the USB 3.0 POWER DELIVERY standard and has a desired power supply capability. In this case, the power reception control unit 211 sets the upper limit value of the current received from the VBUS terminal to the second current value. The power reception control unit 211 can cause electrical power that is needed for the operation of the digital camera 100 to be supplied from the external apparatus, and can charge the battery 106 with a current value such that the total current does not exceed the second current value. If it is not detected that the external apparatus has a power supply capability list that conforms to the USB 3.0 POWER DELIVERY standard and has a desired power supply capability, the power reception control unit 211 sets the upper limit value of the current received from the VBUS terminal to the first current value. That is, the power reception control unit 211 causes electrical power that is needed for the operation of the digital camera 100 to be supplied from the battery 106 using electrical power of the external apparatus, and does not perform charging of the battery 106.

If an operation for switching the power from off to on or from on to off is performed using the power switch 105 in a state in which the external apparatus is connected to the external connection unit 108, the digital camera 100 transitions the power reception control shown in FIG. 4.

As described above, according to the first embodiment, the power reception control is performed while grasping the type of the connected external apparatus through negotiation in the PD standard, and therefore the power reception control can be performed by reliably determining the type of the external apparatus. Accordingly, it is possible to prevent or reduce a situation in which the power supply capability is erroneously authorized due to variation in the response characteristics due to an abnormality or the like in the cable, and the operation of the electronic device fails.

Second Embodiment

A second embodiment will be described next. In the first embodiment, the power reception control unit 211 changed the upper limit value of the current received from the VBUS terminal from the first current value to the second current value if it was detected that the external apparatus has a power supply capability list conforming to the USB 3.0 POWER DELIVERY standard and has a desired power supply capability. The power reception control unit 211 of the second embodiment further adds checking of whether or not the external apparatus has started USB PD communication in a predetermined amount of time conforming to the USB 3.0 POWER DELIVERY standard, to the conditions for determining whether or not the external apparatus conforms to the USB 3.0 POWER DELIVERY standard. When a digital camera 100 is connected, after outputting 5 V to the VBUS terminal, an external apparatus that conforms to the USB 3.0 POWER DELIVERY standard starts USB PD communication using the CC terminal in a predetermined amount of time defined in the USB 3.0 POWER DELIVERY standard.

Figure 5:
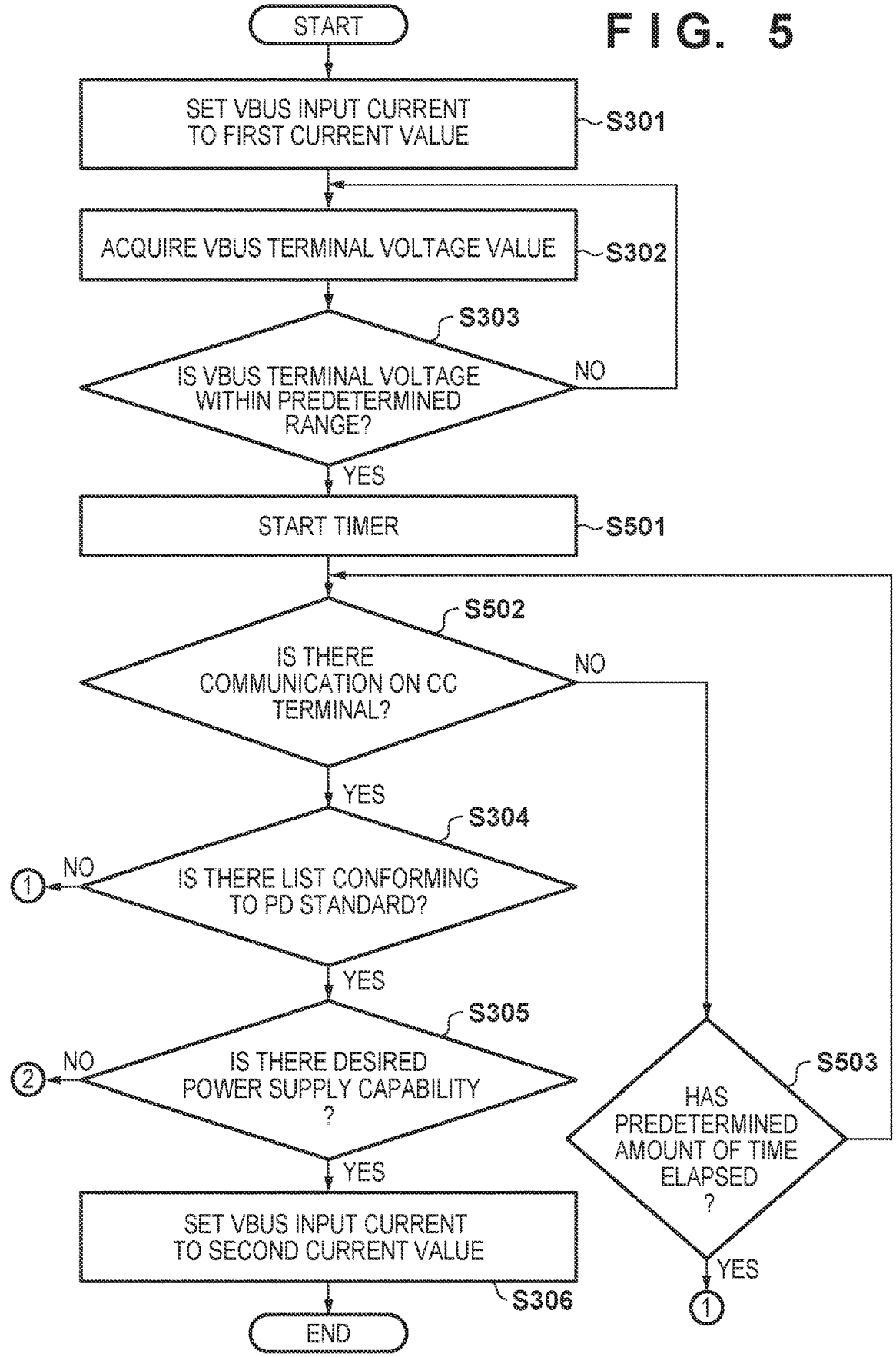
FIG. 5 is a flowchart showing an example of a control operation of a digital camera according to a second embodiment.

FIG. 5 is a flowchart showing an example of control operation processing performed in the case where the external apparatus is connected to the external connection unit 108 with a USB Type-C cable when the power of the digital camera 100 according to the second embodiment is on. In FIG. 5, processes that are similar to those of the first embodiment (FIG. 3A) are denoted by the same reference numerals thereas. Hereinafter, processes that are different from those of the first embodiment will mainly be described.

In step S303, if it is detected that the VBUS terminal voltage is in a predetermined range, the power reception control unit 211 starts a timer (step S501). Then, the power reception control unit 211 checks whether or not the external apparatus has started communication using the CC terminal via the power supply capability acquisition unit 214 (step S502). If it is determined that the external apparatus has started communication using the CC terminal (Yes in step S502), the power reception control unit 211 executes the processing from step S304 onward. On the other hand, if the external apparatus has not started communication using the CC terminal, the power reception control unit 211 determines whether or not a predetermined amount of time has elapsed by referencing the timer activated in step S501 (step S503). If the predetermined amount of time has not elapsed, the processing returns to step S502. On the other hand, if it is determined that the predetermined amount of time has elapsed (Yes in step S503), the power reception control unit 211 advances the processing to step S321 (FIG. 3B). In this manner, if communication using the CC terminal is not started before the elapse of the predetermined amount of time, it is determined that the external apparatus does not conform to the USB 3.0 POWER DELIVERY standard, and the first current value remains set in the input current control unit 213. As a result, the digital camera 100 operates using electrical power supplied from the battery 106, without using electrical power supplied from the external apparatus.

According to the above-described control operation, the external apparatus starting USB PD communication within a predetermined amount of time conforming to the USB 3.0 POWER DELIVERY standard is added to the conditions indicated in the first embodiment as a condition for changing the upper limit value of the current received from the VBUS terminal from the first current value to the second current value. The power reception control unit 211 changes electrical power needed for the operation of the digital camera 100 from being supplied from the battery 106 to being supplied from the external apparatus by changing the upper limit value of the current received from the VBUS terminal from the first current value to the second current value.

The power supply/charging control unit 209 can supply electrical power of the battery 106 or electrical power from the external apparatus to the power control unit 210, and furthermore, can charge the battery 106 with electrical power from the external apparatus. Accordingly, it is possible to charge the battery 106 with the current value that does not exceed the upper limit value of the received current, while simultaneously driving the digital camera 100 with electrical power of the external apparatus.

According to the second embodiment described above, similarly to the first embodiment, it is possible to perform stable power reception control since power reception control is performed while grasping whether or not the connected external apparatus conforms to the PD standard.

Third Embodiment

The first and second embodiments were premised on the battery 106 being connected to the battery connection unit 107 and being able to obtain electrical power for driving the apparatus from the battery. The third embodiment is premised on an electronic apparatus in a state in which the battery 106 is not connected to the battery connection unit 107, or an electronic apparatus having a configuration in which no battery connection unit 107 is present. In this case, the electronic apparatus can be connected to the external apparatus and the electronic apparatus can be started up through a supply of power from the external apparatus.

Figure 6:
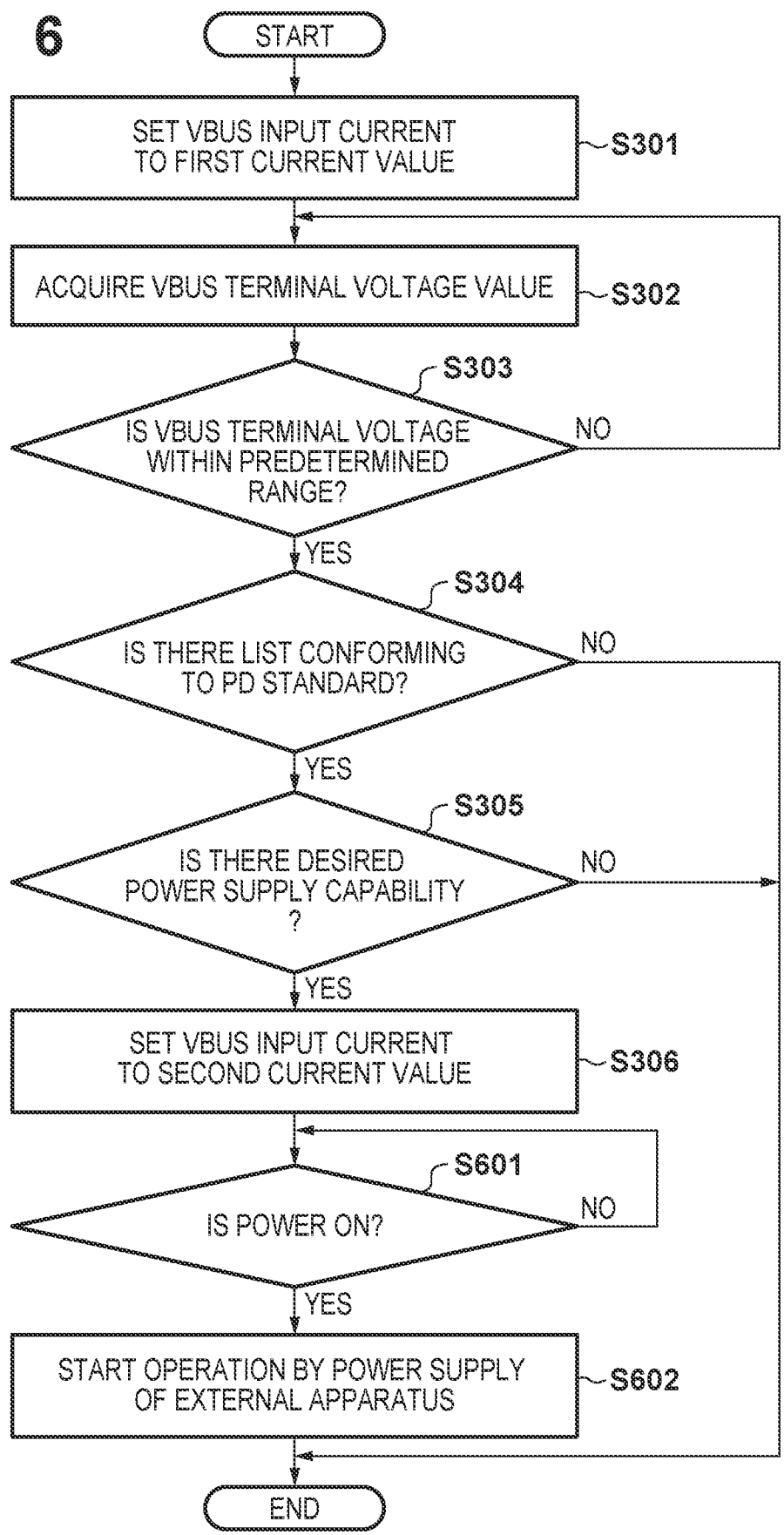
FIG. 6 is a flowchart showing an example of a control operation of a digital camera according to a third embodiment.

FIG. 6 is a flowchart illustrating a control operation of the digital camera 100 according to the third embodiment. In FIG. 6, processes that are similar to those of the first embodiment (FIG. 3A) are denoted by the same reference numerals thereas. As described above, the processing shown in FIG. 6 is executed in a state in which the power of the digital source 100 is off. The first current value set in step S301 is, for example, 2.5 mA, as described in the first embodiment. In this kind of power supply state, even if an instruction to switch on the power is given using the power switch 105, the digital camera 100 cannot start operation. However, it is assumed that it is possible to execute a negotiation process according to the USB 3.0 POWER DELIVERY standard shown in steps S302 to S306.

If the second current value is set in step S306, the digital camera 100 can operate using electrical power supplied from the external apparatus. That is, in step S601, the power control unit 210 waits for an instruction to switch on the power from the power switch 105. If switching on the power is instructed through an operation on the power switch 105 (Yes in step S601), the power control unit 210 supplies electrical power supplied from the external apparatus to the units of the digital camera 100, and thereby the digital camera 100 starts operation (step S602). Note that since the third embodiment is premised on the battery not being mounted, there is no need to set the third current value for charging the battery 106. Accordingly, in the third embodiment, if the power supply capability list conforming to the PD standard cannot be acquired (No in step S304), or if there is no desired power supply capability in the power supply capability list (No in step S305), the power reception control unit 211 ends the processing. Note that in FIG. 6, after the determination of the type of the external apparatus, an operation for switching on the power is waited for, but determination of the type of the external apparatus (steps S302 to S306) may also be performed after the operation for switching on the power is detected.

Figure 7:
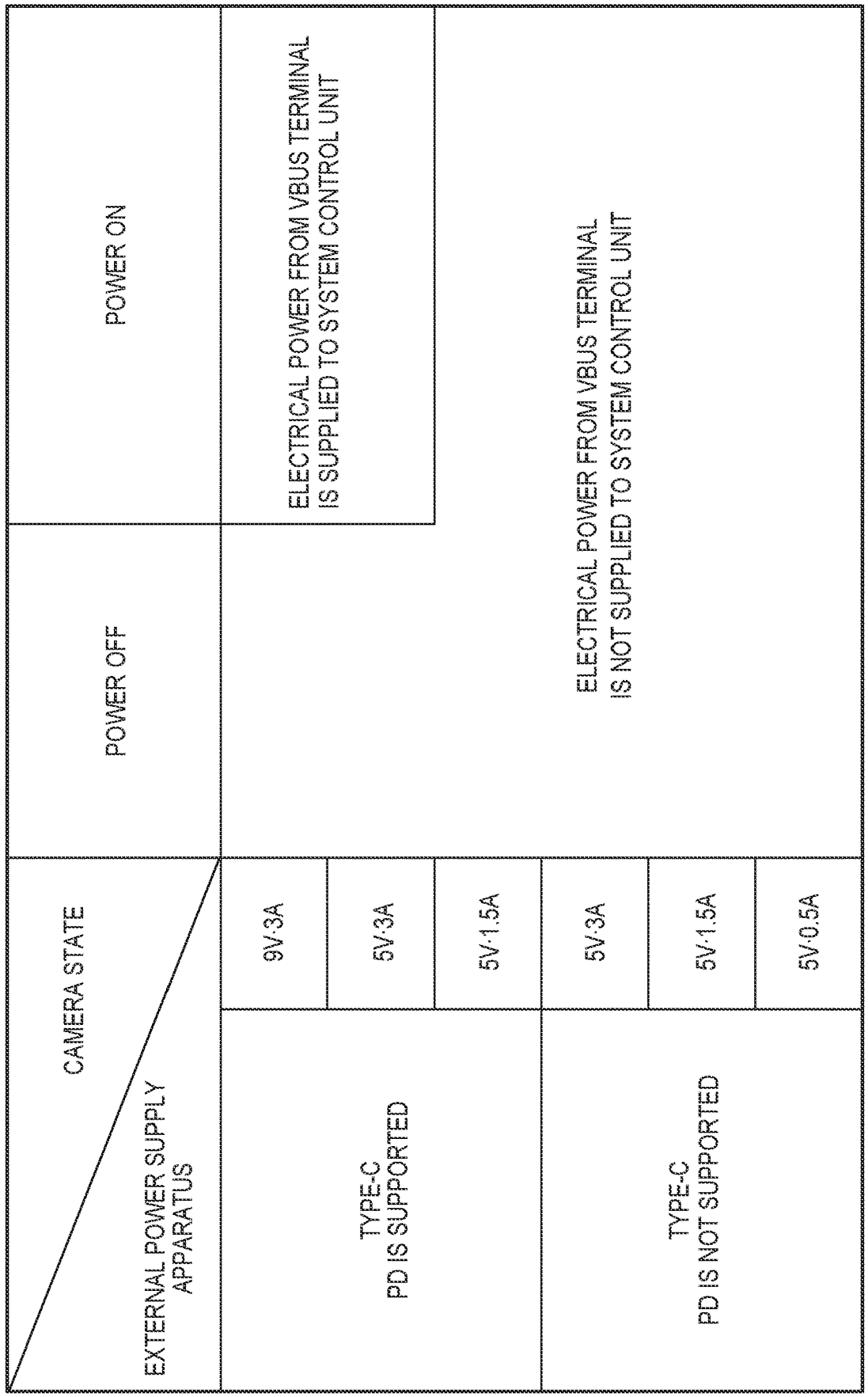
FIG. 7 is a diagram showing an example of power reception control performed according to the type of the external apparatus, according to the third embodiment.

FIG. 7 is a diagram showing an example of power reception control corresponding to the state of the digital camera 100 and the type of the external apparatus connected to the external connection unit 108 according to the above-described processing in FIG. 6. In FIG. 7, if the power of the digital camera 100 is off, the power reception control unit 211 sets the upper limit value of the current received by the input current control unit 213 from the VBUS terminal to the first current value. The first current value is, for example, 2.5 mA, and the digital camera 100 can execute determination of the power supply capability, but cannot start operation even if the power is switched on using the power switch 105. That is, this is the same as there being no supply of power from the external apparatus. If it is not detected that the external apparatus has a power supply capability list that conforms to the USB 3.0 POWER DELIVERY standard and has a desired power supply capability, the power reception control unit 211 keeps the upper limit value of the current received from the VBUS terminal at the first current value. Accordingly, the digital camera 100 cannot start operation even if the power is switched on using the power switch 105.

In FIG. 7, if it is determined that the external apparatus has a power supply capability list that conforms to the USB 3.0 POWER DELIVERY standard and has a desired power supply capability (9 V/3 A, 5 V/3 A), the power reception control unit 211 can supply power to the digital camera 100. In this case, the power reception control unit 211 sets the upper limit value of the current received from the VBUS terminal to the second current value. In this manner, the power reception control unit 211 causes electrical power that is needed for operation of the digital camera 100 to be supplied from the external apparatus, and when switching on the power is instructed using the power switch 105, the digital camera 100 starts operation through the supply of power from the external apparatus.

According to the third embodiment described above, whether or not starting up of the digital camera is possible is controlled while grasping the type of the connected external apparatus through negotiation according to the USB 3.0 POWER DELIVERY standard, and therefore it is possible for the started-up digital camera to operate under a stable supply of electrical power.

Fourth Embodiment

Figure 8:
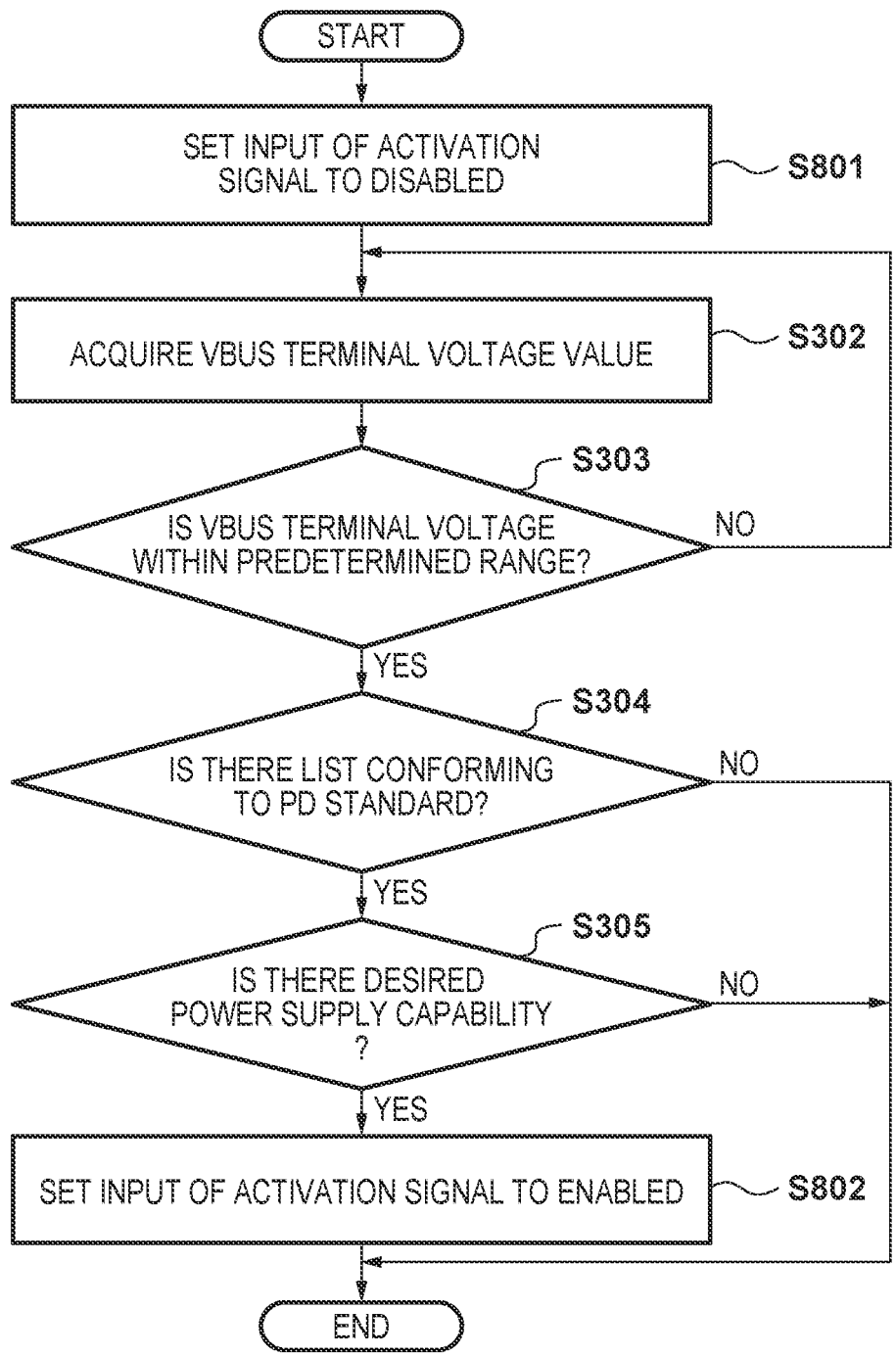
FIG. 8 is a flowchart showing an example of a control operation of a digital camera according to a fourth embodiment.

FIG. 8 is a flowchart showing control operation processing performed in the case where the external apparatus is connected to the external connection unit 108 by a USB Type-C cable, according to the fourth embodiment. In FIG. 8, processes that are similar to those of the first embodiment (FIG. 3A) and the third embodiment (FIG. 6) are denoted by the same reference numerals thereas. Similarly to the third embodiment, the fourth embodiment is also premised on a case in which the battery 106 is not connected to the battery connection unit 107 of the digital camera 100 or a configuration in which the digital camera 100 does not include the battery connection unit 107.

In FIG. 8, the power reception control unit 211 performs setting for disabling input of a startup signal from the power switch 105 in the power control unit 210 (step S801). When the disabling of input of the startup signal is set, even if switching on the power is instructed using the power switch 105, the power control unit 210 does not start supplying the needed electrical power to the units including the system control unit 207 using electrical power supplied from the power supply/charging control unit 209. Thereafter, by executing the processing from steps S302 to S305, the power reception control unit 211 determines whether or not the connected external apparatus conforms to the PD standard and has a desired power supply capability.

If the external apparatus conforms to the PD standard (Yes in step S304) and the power supply capability list includes a desired power supply capability such as 5 V/3 A (Yes in step S305), the power reception control unit 211 performs setting for enabling input of the startup signal in the power control unit 210 (step S802). When a setting for enabling input of the startup signal is performed, the power control unit 210 supplies the needed electrical power to the units including the system control unit 207 for a needed period using electrical power suppled from the power supply/charging control unit 209 according to an instruction to switch on the power from the power switch 105.

As described above, if it is detected that the external apparatus has a power supply capability list conforming to the USB 3.0 POWER DELIVERY standard and has a desired power supply capability, the power reception control unit 211 changes the setting for inputting the startup signal of the power control unit 210 from disabled to enabled. Accordingly, the digital camera 100 can start operation when the power is switched on using the power switch 105. Accordingly, since whether or not starting up of the digital camera is possible is controlled while grasping the type of the connected external apparatus through negotiation according to the USB 3.0 POWER DELIVERY standard, and therefore the started-up digital camera can operate under a stable supply of power.

Fifth Embodiment

In the third and fourth embodiments, if it is detected that the external apparatus has a power supply capability list that conforms to the USB 3.0 POWER DELIVERY standard and has a desired power supply capability, the power reception control unit 211 changes the upper limit value of the current received from the VBUS terminal from the first current value to the second current value. In the fifth embodiment, the power reception control unit 211 further checks whether or not the external apparatus has changed the output voltage to the VBUS in a predetermined amount of time conforming to the USB 3.0 POWER DELIVERY standard. When the digital camera 100 is connected, after outputting 5 V to the VBUS terminal, an external apparatus that conforms to the USB 3.0 POWER DELIVERY standard starts USB PD communication using the CC terminal. The external apparatus conforming to the USB 3.0 POWER DELIVERY standard provides the power supply capability list to the digital camera 100. When the digital camera 100 requests power supply at a desired capability from the external apparatus, if the external apparatus conforming to the USB 3.0 POWER DELIVERY standard can handle the request, the external apparatus, after notifying the digital camera 100 that the external apparatus accepts the request, changes the voltage output to the VBUS in the predetermined amount of time.

Figure 9A:
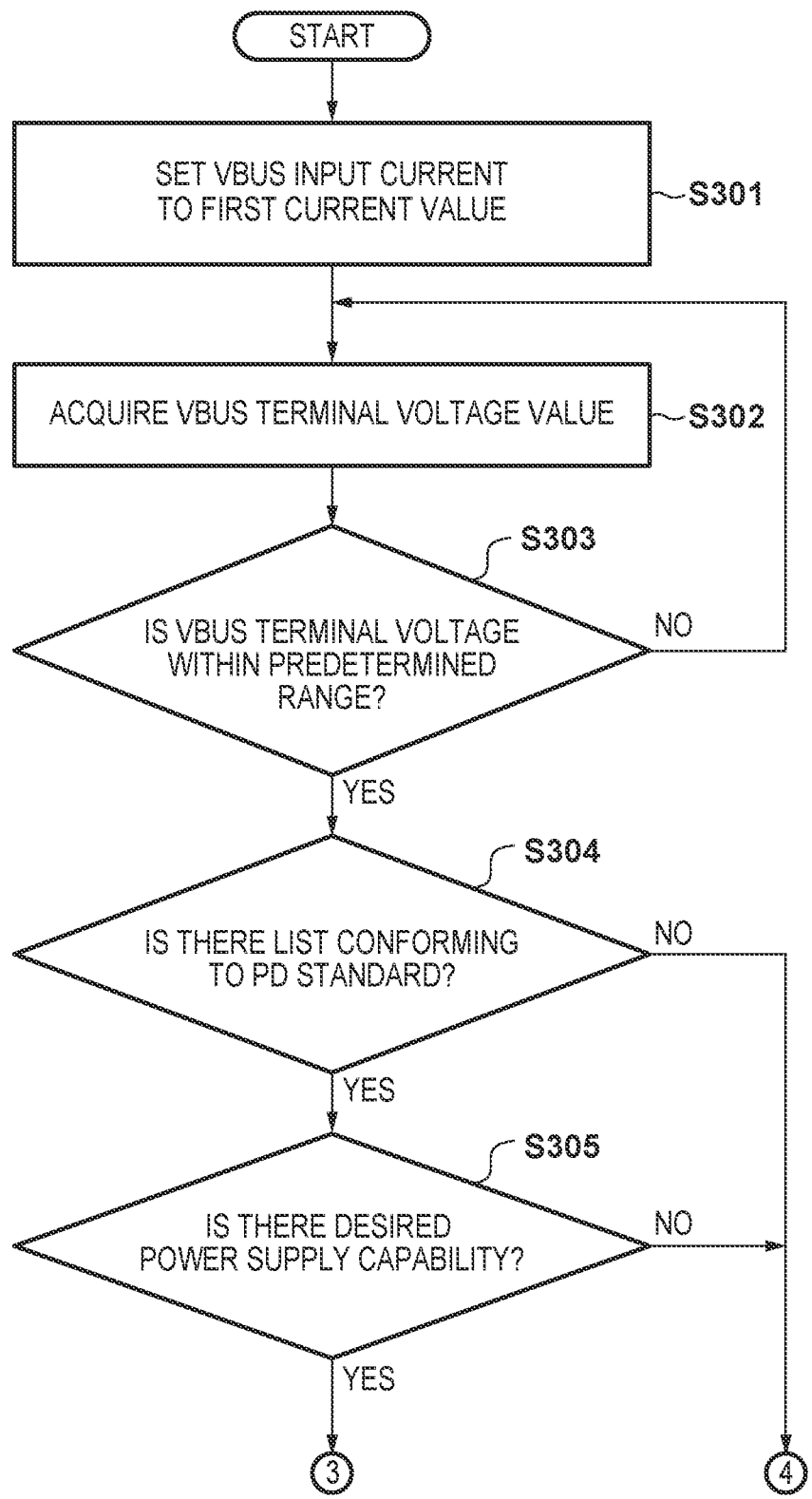
FIG. 9A is a flowchart showing an example of a control operation of a digital camera according to a fifth embodiment.
Figure 9B:
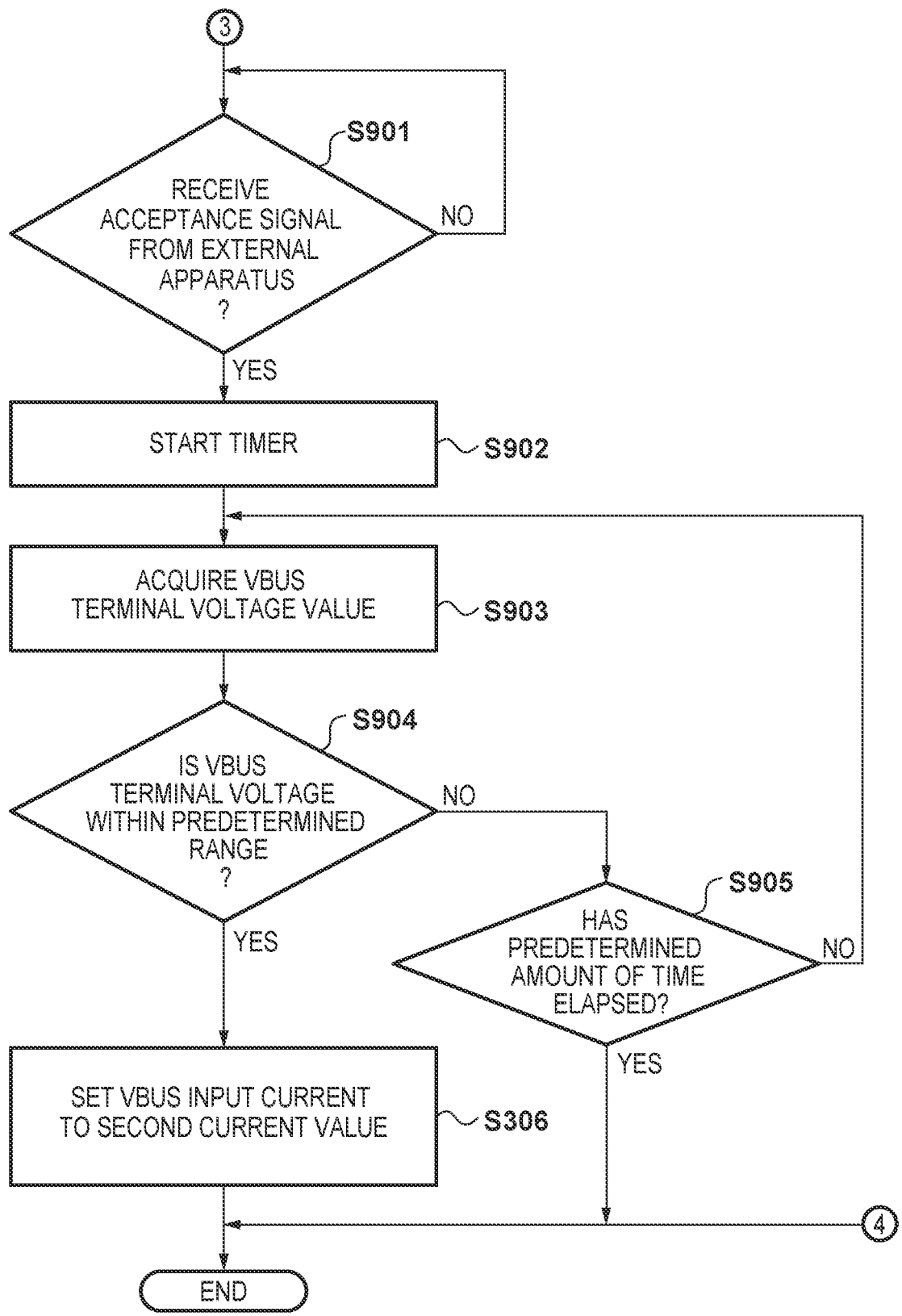
FIG. 9B is a flowchart showing an example of a control operation of the digital camera according to the fifth embodiment.

FIGS. 9A and 9B are flowcharts showing control operation processing performed in the case where the external apparatus is connected to the external connection unit 108 using a USB Type-C cable, according to the fifth embodiment. In FIGS. 9A and 9B, processes that are similar to those of the first embodiment (FIG. 3A) and the third embodiment (FIG. 6) are denoted by the same reference numerals thereas. Similarly to the third embodiment, the fifth embodiment is also premised on a case in which the battery 106 is not connected to the battery connection unit 107 of the digital camera 100 or a configuration in which the digital camera 100 does not include the battery connection unit 107.

If the external apparatus has a power supply capability list conforming to the USB 3.0 POWER DELIVERY standard and has a desired power supply capability in the power supply capability list (Yes in steps S304 and S305), the power reception control unit 211 requests power supply at a desired capability from the external apparatus. Then, the power reception control unit 211 checks whether or not an acceptance signal has been received from the external apparatus in response to the request (step S901). For example, if 9 V/3 A, which is the desired power supply capability, is in the power supply capability list, the power reception control unit 211 requests power supply at a desired capability from the external apparatus. The power reception control unit 211 waits for confirmation of the acceptance of the request from the external apparatus (No in step S901), and when acceptance from the external apparatus is confirmed (Yes in step S901), the power reception control unit 211 starts a timer (step S902).

The power reception control unit 211 acquires voltage value information of the VBUS terminal from the VBUS voltage value acquisition unit 212 (step S903). The power reception control unit 211 determines whether or not the VBUS terminal voltage is a value in a predetermined range corresponding to the requested power supply capability (step S904). The predetermined range is, for example, ±5% of the voltage value of the requested power supply capability. For example, if a power supply capability of 9 V/3 A is requested, the predetermined range is 8.55 V or more and 9.45 V or less. If it is determined that the VBUS terminal voltage is a value in a predetermined range (Yes in step S904), the power reception control unit 211 sets the upper limit value of the current to be received by the input current control unit 213 through the VBUS terminal to the second current value (step S306) and the control operation ends. For example, in the case of the above-described request (9 V/3 A), the second current value is 3 A.

On the other hand, if the VBUS terminal voltage is not a value in the predetermined range (No in step S904), the power reception control unit 211 refers to the timer started up in step S902, and checks whether or not a predetermined amount of time has elapsed since the acceptance signal was received from the external apparatus (step S905). If the predetermined amount of time has not elapsed since the acceptance signal was received from the external apparatus (No in step S905), the power reception control unit 211 returns the processing to step S903. If the predetermined amount of time has elapsed since the acceptance signal was received from the external apparatus (Yes in step S905), the power reception control unit 211 ends the control operation.

According to the above-described control operation, the power reception control unit 211 adds the voltage at the VBUS terminal being changed in a predetermined amount of time conforming to the USB 3.0 POWER DELIVERY standard after the request for the power supply capability is accepted, as a condition for determining whether or not the external apparatus conforms to the USB 3.0 POWER DELIVERY standard. If the voltage of the VBUS terminal reaches a value corresponding to the requested power supply capability within the predetermined amount of time, the power reception control unit 211 changes the upper limit value of the current to be received from the VBUS terminal from the first current value to the second current value (step S306). The power reception control unit 211 can receive electrical power needed to operate the digital camera 100 from the external apparatus by changing the upper limit value of the current to be received from the VBUS terminal from the first current value to the second current value. In this state, the digital camera 100 can start operation when the power is switched on using the power switch 105.

According to the fifth embodiment described above, whether or not starting up of the digital camera is possible is controlled while grasping the type of the connected external apparatus through negotiation according to the USB 3.0 POWER DELIVERY standard, and therefore it is possible for the started-up digital camera to operate under a stable supply of electrical power.

It should be noted that in the second embodiment, communication in the PD standard using the CC terminal being started within a predetermined amount of time after the VBUS voltage enters the predetermined range is added to the conditions for determining whether or not the external apparatus conforms to the PD standard. It is clear that the addition of this kind of condition can be applied to the third to fifth embodiments as well. Similarly, it is also clear that the condition that the voltage value of the VBUS terminal reaches the voltage value range corresponding to the request within a predetermined amount of time after the acceptance signal is received in response to the request for the power supply capability, which was described in the fifth embodiment, can be applied to the first and second embodiments.

As described above, according to the first to fifth embodiments, the power reception control unit 211 determines through communication using the CC terminal whether or not the external apparatus connected to the USB interface has a predetermined power supply capability according to the USB 3.0 POWER DELIVERY standard. Then, the power reception control unit 211 performs power control such that if it is determined through communication using the CC terminal that the external apparatus has a predetermined power supply capability, an operation of supplying power to the system using electrical power from the VBUS terminal is enabled. On the other hand, if it is determined through communication using the CC terminal that the external apparatus does not include the predetermined power supply capability, the power reception control unit 211 performs power control such that an operation of supplying power to the system is not executed. Also, if communication using the CC terminal was not performed, the power reception control unit 211 performs power control such that an operation of supplying power to the system is not executed. That is, even if it is determined that the external apparatus has a predetermined power supply capability using a method that is not communication using the CC terminal, the power reception control unit 211 performs power control such that the operation of supply power to the system is not executed. Accordingly, the electronic apparatus of the above-described embodiments can perform power reception control upon detecting that the connected external apparatus conforms to the USB PD standard and has a desired power supply capability, and can perform stable operation. Note that at least a portion of the processing indicated by the flowcharts of the above-described embodiments may also be realized by, for example, the processor of the system control unit 207 executing a program stored in the memory.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

The invention claimed is:

1. An electronicdevice comprising:
    a communication unit that acquires a power supply capability of an external apparatus via a CC terminal; and
    a control unit that performscontrol such that electrical power received via a VBUS terminal is supplied to a load in response to being determined through the communication that the external apparatus has a predetermined power supply capability.

2. The electronic device according to claim 1, wherein the communication is communication that conforms to USB Power Delivery standard, and is for acquiring the power supply capability of the external apparatus.

3. The electronic device according to claim 1, wherein the control unit determines, through the communication, that the external apparatus has the predetermined power supply capability if electrical power that can be supplied by the external apparatus is greater than or equal to a threshold.

4. The electronic device according to claim 1, wherein, if the communication unit cannot execute the communication with the external apparatus via the CC terminal, the control unit acquires the power supply capability of the external apparatus based on the voltage value of the CC terminal.

5. The electronic device according to claim 1, wherein the control unit requests to supply power corresponding to the predetermined power supply capability via the CC terminal, and
    if the voltage value of the VBUS terminal does not fall within a predetermined range before the elapse of a predetermined amount of time since the request, the control unit does not put the electronic device in an operable state.

6. The electronic device according to claim 1, wherein, if communication according to USB POWER DELIVERY standard using the CC terminal cannot be started before the elapse of a predetermined amount of time after the voltage of the VBUS terminal enters a predetermined range, the control unit determines that the external apparatus does not have the predetermined power supply capability.

7. The electronic device according to claim 1, wherein the load includes a processor for controlling operation of the electronic device.

8. The electronic device according to claim 1, further comprising an image capture unit that captures an image, wherein the load includes a circuit for controlling the image capture unit.

9. The electronic device according to claim 1, wherein the load includes a display control circuit for displaying an image on a display unit.

10. The electronicapparatus according to claim 1, wherein the control unit performs control such that electrical power received via the VBUS terminal is not supplied to the load in response to it is not determined through the communication that the external apparatus has the predetermined power supply capability and it is determined thatthe external apparatus has the predetermined powersupply capability without performingthe communication.

11. The electronic device according to claim 1, further comprising a connection unit that connects to a secondary battery for supplying electrical power to the electronic device,
wherein if it is determined through the communication that the external apparatus has a predetermined power supply capability, the control unit supplies electrical power received via the VBUS terminal to the load, and if not, the control unit supplies electrical power received from the secondary battery to the load.

12. The electronic device according to claim 4, further comprising a power switch for switching a power of the electronic device on or off,
wherein if it is determined that the power of the electronic device is off and the external apparatus has the predetermined power supply capability, the control unit charges a secondary battery using electrical power received from the VBUS terminal, regardless of whether or not the predetermined communication was executed with the external apparatus.

13. A method comprising:
acquiring a power supply capability of an external apparatus via a CC terminal;
performing control such that electrical power received via a VBUS terminal is supplied to a load in response to being determined through the communication that the external apparatus has a predetermined power supply capability.

14. The method according to claim 13, wherein the communication is communication that conforms to USB Power Delivery standard, and is for acquiring the power supply capability of the external apparatus.

15. The method according to claim 13, wherein, in the power control, it is determined, through the communication, that the external apparatus has the predetermined power supply capability if electrical power that can be supplied by the external apparatus is greater than or equal to a threshold.

16. The method according to claim 13, wherein if the communication cannot be performed with the external apparatus via the CC terminal in the communication, the power supply capability of the external apparatus is acquired based on the voltage value of the CC terminal in the power control.

17. The method according to claim 13, wherein in the power control, supplying power corresponding to the predetermined power supply capability is requested via the CC terminal, and
if the voltage value of the VBUS terminal does not fall within a predetermined range before the elapse of a predetermined amount of time since the request, the electronic device is not put in an operable state.

18. The method according to claim 13, wherein in the power control, if communication according to USB POWER DELIVERY standard using the CC terminal cannot be started before the elapse of a predetermined amount of time after the voltage of the VBUS terminal enters a predetermined range, it is determined that the external apparatus does not have the predetermined power supply capability.

19. The method according to claim 13, wherein the load includes a processor for controlling operation of the electronic device.

20. The method according to claim 13, wherein the electronic device further includes an image capture unit that captures an image, and
the load includes a circuit for controlling the image capture unit.

21. The method according to claim 13, wherein the load includes a display control circuit for displaying an image on a display unit.

22. The method according to claim 13, wherein performing control such that electrical power received via the VBUS terminal is not supplied to the load in response to it is not determined through the communication that the external apparatus has the predetermined power supply capability and it is determined that the external apparatus has the predetermined power supply capability without performing the communication.

23. The method according to claim 13, wherein the electronic device further includes a connection unit that connects to a secondary battery for supplying electrical power to the electronic device, and
in the power control, if it is determined through the communication that the external apparatus has a predetermined power supply capability, electrical power received via the VBUS terminal is supplied to the load, and if not, electrical power received from the secondary battery is supplied to the load.

24. The method according to claim 23, wherein the electronic device further includes a power switch for switching a power of the electronic device on or off, and
in the power control, if it is determined that the power of the electronic device is off and the external apparatus has the predetermined power supply capability, a secondary battery is charged using electrical power received from the VBUS terminal, regardless of whether or not the predetermined communication was executed with the external apparatus.

25. A non-transitory storage medium that stores a program causing a computer to execute a method, the method comprising:
acquiring a power supply capability of an external apparatus via a CC terminal;
performing control such that electrical power received via a VBUS terminal is supplied to a load in response to being determined through the communication that the external apparatus has a predetermined power supply capability.

26. The non-transitory storage medium according to claim 25, wherein performing control such that electrical power received via the VBUS terminal is not supplied to the load in response to it is not determined through the communication that the external apparatus has the predetermined powersupplycapability and it is determined that the external apparatus has the predetermined power supply capability without performing the communication.

\* \* \* \* \*